(12) United States Patent
Cheng

(10) Patent No.: US 10,582,491 B2
(45) Date of Patent: Mar. 3, 2020

(54) INFORMATION TRANSMISSION METHOD AND DEVICE

(71) Applicant: HUAWEI TECHNOLOGIES CO., LTD., Shenzhen (CN)

(72) Inventor: Yan Cheng, Beijing (CN)

(73) Assignee: HUAWEI TECHNOLOGIES CO., LTD., Shenzhen (CN)

(\*) Notice: Subject to any disclaimer, the term of this patent is extended or adjusted under 35 U.S.C. 154(b) by 0 days.

(21) Appl. No.: 16/147,858

(22) Filed: Sep. 30, 2018

(65) Prior Publication Data

US 2019/0037551 A1    Jan. 31, 2019

Related U.S. Application Data

(63) Continuation of application No. PCT/CN2017/078985, filed on Mar. 31, 2017.

(30) Foreign Application Priority Data

Mar. 31, 2016 (CN) .......................... 2016 1 0200962

(51) Int. Cl.
*H04W 72/12* (2009.01)
*H04L 5/00* (2006.01)
(Continued)

(52) U.S. Cl.
CPC ......... *H04W 72/044* (2013.01); *H04L 5/0028* (2013.01); *H04L 5/0064* (2013.01);
(Continued)

(58) Field of Classification Search
CPC ... H04B 7/0632; H04L 5/0007; H04L 5/0073; H04L 25/0204
See application file for complete search history.

(56) References Cited

U.S. PATENT DOCUMENTS 8,265,012 B2\* 9/2012 Jung ..................... H04L 1/0017
370/329
9,143,302 B2\* 9/2015 Murakami ............. H04B 1/692
(Continued)

FOREIGN PATENT DOCUMENTS

CN 101282160 A 10/2008
CN 106385709 A 2/2017
(Continued)

OTHER PUBLICATIONS

XP51053450 R1-160131 Intel Corporation,"NB-loT Uplink Shared Channel Design",3GPP TSG RAN WG1 NB-loT Ad-Hoc Meeting,Budapest, Hungary, Jan. 18-20, 2016, total 9 pages.

*Primary Examiner* — Joshua L Schwartz
(74) *Attorney, Agent, or Firm* — Kilpatrick Townsend & Stockton LLP

(57) ABSTRACT

Embodiments provide an information transmission method and a device. The method includes: determining, by a first device, a subcarrier spacing of a serving cell; determining a resource unit of the serving cell based on the subcarrier spacing of the serving cell; and sending information to a second device in the serving cell based on the resource unit of the serving cell, or receiving, in the serving cell based on the resource unit of the serving cell, information sent by the second device. In this way, information transmission is implemented based on a plurality of sets of system parameters.

18 Claims, 2 Drawing Sheets

A first device determines a subcarrier spacing of a serving cell — S101

The first device determines a resource unit of the serving cell based on the subcarrier spacing of the serving cell — S102

The first device sends information to a second device in the serving cell based on the resource unit of the serving cell, or receives, in the serving cell based on the resource unit of the serving cell, information sent by the second device — S103

(51) Int. Cl.
*H04W 72/04* (2009.01)
*H04L 27/26* (2006.01)
(52) U.S. Cl.
CPC ......... *H04L 27/2602* (2013.01); *H04W 72/04* (2013.01); *H04W 72/0406* (2013.01); *H04W 72/1257* (2013.01); *H04L 5/0048* (2013.01); *H04L 5/0087* (2013.01); *H04W 72/12* (2013.01)

(56) References Cited

U.S. PATENT DOCUMENTS

| | | | |
|---|---|---|---|
| 2004/0190482 A1* | 9/2004 | Baum | H04W 72/082 370/347 |
| 2007/0213070 A1* | 9/2007 | Kim | H04L 1/0003 455/452.2 |
| 2011/0032850 A1 | 2/2011 | Cai | |
| 2011/0103406 A1 | 5/2011 | Cai et al. | |
| 2019/0052504 A1 | 2/2019 | Hayashi et al. | |

FOREIGN PATENT DOCUMENTS

| | | |
|---|---|---|
| EP | 3429291 A1 | 1/2019 |
| JP | 2019057747 A | 4/2019 |
| WO | 2008097038 A2 | 8/2008 |
| WO | 2015131827 A1 | 9/2015 |
| WO | 2017164222 A1 | 9/2017 |

\* cited by examiner

INFORMATION TRANSMISSION METHOD AND DEVICE

CROSS-REFERENCE TO RELATED DISCLOSURES

This application is a continuation of International Application No. PCT/CN2017/078985, filed on Mar. 31, 2017, which claims priority to Chinese Patent Application No. 201610200962.0, filed on Mar. 31, 2016. The disclosures of the aforementioned applications are hereby incorporated by reference in their entireties.

TECHNICAL FIELD

Embodiments of this disclosure relate to communications technologies, and in particular, to an information transmission method and a device.

BACKGROUND

The 5th Generation (5G) is purpose-built to support higher system performance, different services, different deployment scenarios, and different spectrums.

However, disclosure scenarios of different services, different deployment scenarios, and different spectrums have different requirements on a system parameter (for example, a subcarrier spacing, or a parameter of a resource unit). To be specific, the 5G needs to support a plurality of sets of system parameters (numerology). To enable the 5G to support different services, different deployment scenarios, and different spectrums with high performance, how to perform information transmission based on the plurality of sets of system parameters in a 5G communications system is to be resolved.

SUMMARY

Embodiments of this disclosure provide an information transmission method and a device, so as to implement information transmission based on a plurality of sets of system parameters.

According to a first aspect, this disclosure provides an information transmission method, and the method includes:

determining, by a first device, a subcarrier spacing of a serving cell; determining a resource unit of the serving cell based on the subcarrier spacing of the serving cell; and sending information to a second device in the serving cell based on the resource unit of the serving cell, or receiving, in the serving cell based on the resource unit of the serving cell, information sent by the second device.

Based on the information transmission method provided in the first aspect, the first device first determines the subcarrier spacing of the serving cell, and determines the resource unit of the serving cell based on the subcarrier spacing of the serving cell, so as to send the information to the second device in the serving cell based on the resource unit of the serving cell, or receive, in the serving cell based on the resource unit of the serving cell, the information sent by the second device, thereby implementing information transmission based on a plurality of sets of system parameters.

According to a second aspect, an embodiment of this disclosure provides a device, the device is a first device, and the device includes:

a processing unit, configured to: determine a subcarrier spacing of a serving cell; and determine a resource unit of the serving cell based on the subcarrier spacing of the serving cell; and a transceiver unit, configured to send information to a second device in the serving cell based on the resource unit of the serving cell determined by the processing unit, or receive, in the serving cell based on the resource unit of the serving cell determined by the processing unit, information sent by the second device.

For beneficial effects of the device provided in the second aspect and all possible implementations of the second aspect, refer to beneficial effects of the first aspect and all possible implementations of the first aspect, and details are not described herein again.

DESCRIPTION OF EMBODIMENTS

Figure 1:
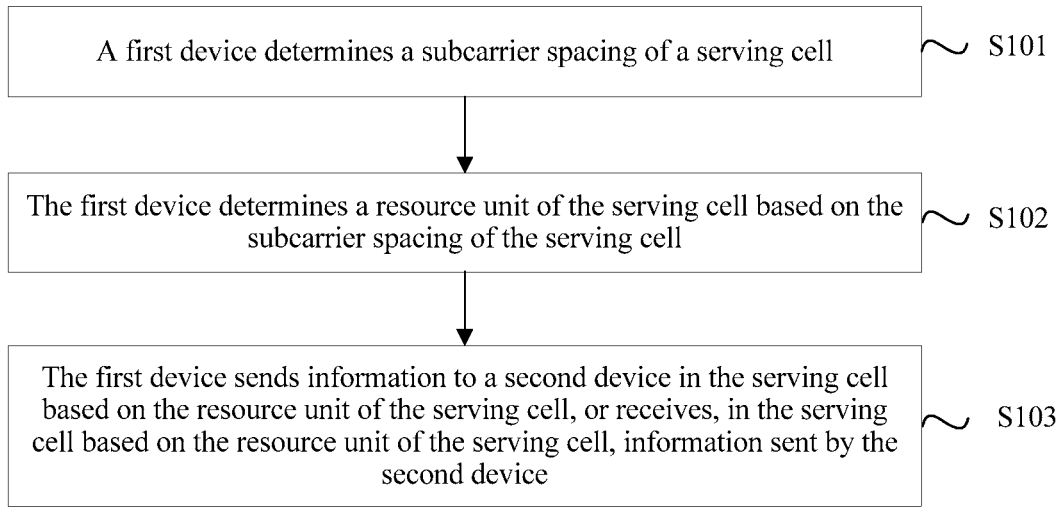
FIG. 1 is a schematic flowchart of Method Embodiment 1 of an information transmission method according to this disclosure.

User equipment mentioned in the embodiments of this disclosure may be a wireless terminal such as a mobile phone or a tablet computer. The wireless terminal includes a device that provides a user with a voice service and/or a data service. In some embodiments, the device may be a handheld device with a radio connection function, or another processing device connected to a wireless modem. In addition, the wireless terminal may communicate with one or more core networks through a radio access network (RAN). For example, the wireless terminal may be specifically a mobile terminal such as a mobile phone (or referred to as a "cellular" phone) or a computer with a mobile terminal. The computer with a mobile terminal may be a portable, pocket-sized, handheld, or computer built-in mobile apparatus, or an in-vehicle mobile apparatus that can exchange voice and/or data with the core network. For example, the wireless terminal may be a device such as a personal communications service (PCS) phone, a cordless telephone set, a Session Initiation Protocol (SIP) phone, a wireless local loop (WLL) station, or a personal digital assistant (PDA). The wireless terminal may also be referred to as a system, a subscriber unit, a subscriber station, a mobile station, a remote station, an access point, a remote terminal, an access terminal, a user terminal, a user agent, a user device, or user equipment. The user equipment in the embodiments of this disclosure may also be a vehicle or the like in Vehicle to X (V2X) communication.

A network device mentioned in the embodiments of this disclosure may be any device in a cellular communications network, for example, a base station (such as the access point), and the base station may be a device that is in an access network and that communicates with the wireless terminal over an air interface by using one or more sectors. The base station may be configured to convert a received over-the-air frame to an IP packet or convert an IP packet to a received over-the-air frame and serve as a router between the wireless terminal and a remaining portion of the access network. The remaining portion of the access network may include an Internet Protocol (IP) network. The base station may further coordinate attribute management on the air interface. For example, the base station may be a base transceiver station (BTS) in GSM or CDMA, or a NodeB in WCDMA, or an evolved NodeB (NodeB, eNB, or eNodeB, evolved Node B) in LTE. This is not limited in the embodiments of this disclosure. The network device in the embodiments of this disclosure may be a terminal device in Device to Device (D2D) communication that is similar to the user equipment in the embodiments of this disclosure, or may be a vehicle or the like in the Vehicle to X (V2X) communication.

A first device and a second device in this disclosure may be network devices, or may be user equipment. In some embodiments, when the first device is a network device, the second device in this disclosure is user equipment. In some embodiments, when the first device is user equipment, the second device in this disclosure is a network device.

An information transmission method provided in the embodiments of this disclosure may be applicable to user equipment and a network device in a 5G communications system, a Long Term Evolution (LTE) communications system, and user equipment and a network device in the LTE communications system. The network device described herein may include at least one serving cell. Certainly, the information transmission method in the embodiments of this disclosure includes, but is not limited to, the foregoing disclosure scenarios. The information transmission method provided in the embodiments of this disclosure can be used in all scenarios in which a serving cell supports a plurality of sets of system parameters.

The 5G is purpose-built to support higher system performance, different services, different deployment scenarios, and different spectrums. (a) The different services include enhanced mobile broadband (eMBB), machine type communication (MTC), ultra-reliable and low latency communications (URLLC), a multimedia broadcast multicast service (MBMS), positioning, and the like. (b) The different deployment scenarios include an indoor hotspot scenario, a dense urban scenario, a suburban scenario, an urban macro coverage scenario, a high-speed railway scenario, and the like. (c) The 5G supports a spectrum range of up to 100 GHz, where a primary frequency band is less than or equal to 6 GHz, and a secondary frequency band is greater than 6 GHz.

Disclosure scenarios of different services, different deployment scenarios, and different spectrums have different requirements on a system parameter (for example, a subcarrier spacing, a resource unit, or a resource unit parameter). To be specific, the 5G needs to support a plurality of sets of system parameters (numerology). To enable the 5G to support different services, different deployment scenarios, and different spectrums with high performance, how to perform information transmission based on the plurality of sets of system parameters in a 5G communications system is to be resolved.

In the embodiments of this disclosure, for different services, different deployment scenarios, and different spectrums, the first device first determines a subcarrier spacing of a serving cell, and determines a resource unit of the serving cell based on the subcarrier spacing of the serving cell, so as to send information to a second device in the serving cell based on the determined resource unit, or receive, in the serving cell based on the determined resource unit, information sent by the second device. It can be learned that the first device can determine, from sets of system parameters based on an disclosure scenario, a system parameter (such as the subcarrier spacing or the resource unit) corresponding to the disclosure scenario, so as to perform information transmission based on the system parameter.

FIG. 1 is a schematic flowchart of Embodiment 1 of an information transmission method according to this disclosure. This embodiment of this disclosure may be applied to a single carrier system and/or a multicarrier system. As shown in FIG. 1, the method in this embodiment may include the following steps.

S101. A first device determines a subcarrier spacing of a serving cell.

In this step, the first device determines the subcarrier spacing of the serving cell, so as to subsequently determine a resource unit of the serving cell based on the subcarrier spacing. The "serving cell" in this embodiment of this disclosure may be a serving cell configured by a network side device for user equipment, or a serving cell serving user equipment, or a serving cell accessed by user equipment. The "serving cell" in this embodiment of this disclosure may be a primary serving cell of the user equipment, or a secondary serving cell of the user equipment. Optionally, when the first device is a network device, this step may be: determining, by the network device, a subcarrier spacing of a serving cell of user equipment; or when the first device is user equipment, this step may be: determining, by the user equipment, a subcarrier spacing of a serving cell.

Optionally, the first device may determine the subcarrier spacing of the serving cell based on a correspondence between a carrier frequency and a subcarrier spacing, a correspondence between a carrier frequency set and a subcarrier spacing set, or the like. Certainly, the first device may determine the subcarrier spacing of the serving cell in another manner. This embodiment of this disclosure imposes no limitation thereto. Optionally, the subcarrier spacing of the serving cell may be a multiple of 15 kHz, a multiple of 17.5 kHz, or a multiple of 16.875 kHz. Certainly, the subcarrier spacing of the serving cell may be another value. This embodiment of this disclosure imposes no limitation thereto.

S102. The first device determines a resource unit of the serving cell based on the subcarrier spacing of the serving cell.

In this step, the first device determines, based on the subcarrier spacing of the serving cell, the resource unit corresponding to the subcarrier spacing. Optionally, the first device determines a parameter of the resource unit of the serving cell based on the subcarrier spacing of the serving cell, and determines the resource unit of the serving cell based on the parameter of the resource unit. The parameter of the resource unit includes at least one of a length of the resource unit, a quantity of symbols included in the resource unit, a quantity of subcarriers included in the resource unit, an effective symbol length of a symbol included in the resource unit, and a cyclic prefix (CP) length of a symbol included in the resource unit. Optionally, the parameter of the resource unit may further include other information. This embodiment of this disclosure imposes no limitation thereto. In this embodiment of this disclosure, the resource unit may be a time-frequency resource of a specific frequency domain width in specific duration.

S103. The first device sends information to a second device in the serving cell based on the resource unit of the serving cell, or receives, in the serving cell based on the resource unit of the serving cell, information sent by the second device.

In this step, the first device sends the information to the second device in the serving cell based on the resource unit of the serving cell determined in step S102, or receives, in the serving cell based on the resource unit of the serving cell determined in step S102, the information sent by the second device.

Optionally, when the first device is a network device, this step may be: sending, by the network device, information to user equipment in the serving cell based on the resource unit of the serving cell. Optionally, the information may include at least one of downlink data, downlink control information, and a downlink reference signal. Alternatively, this step may be: receiving, by the network device in the serving cell based on the resource unit of the serving cell, information sent by user equipment. Optionally, the information may include at least one of uplink data and uplink control information.

Optionally, when the first device is user equipment, this step may be: sending, by the user equipment, information to a network device in the serving cell based on the resource unit of the serving cell. Optionally, the information may include at least one of uplink data and uplink control information. Alternatively, this step may be: receiving, by the user equipment in the serving cell based on the resource unit of the serving cell, information sent by a network device. Optionally, the information may include at least one of downlink data, downlink control information, and a downlink reference signal.

Certainly, information transmitted between the first device and the second device not only includes the foregoing content, but also may include other content. This embodiment of this disclosure imposes no limitation thereto.

In this embodiment of this disclosure, the subcarrier spacing of the serving cell may be different for different services, different deployment scenarios, and different spectrums. The first device first determines the subcarrier spacing of the serving cell, and determines the resource unit of the serving cell based on the subcarrier spacing of the serving cell. Further, the first device sends the information to the second device in the serving cell based on the resource unit of the serving cell, or receives, in the serving cell based on the resource unit of the serving cell, the information sent by the second device. In this way, information transmission is implemented based on a plurality of sets of system parameters.

In Embodiment 2 of an information transmission method in this disclosure, a process in which the subcarrier spacing of the serving cell is a multiple of 15 kHz is described in detail on a basis of the foregoing embodiment.

In this embodiment of this disclosure, optionally, step S101 may be implemented in at least the following manners:

In a first possible implementation, the first device determines a carrier frequency of the serving cell, and determines the subcarrier spacing of the serving cell based on the carrier frequency.

In this embodiment of this disclosure, when the first device determines the carrier frequency of the serving cell, the first device determines, based on a preset correspondence between a carrier frequency and a subcarrier spacing, the subcarrier spacing corresponding to the carrier frequency of the serving cell. For example, the preset correspondence between a carrier frequency and a subcarrier spacing may be as follows: When the carrier frequency is less than or equal to 3 GHz, the subcarrier spacing is equal to 15 kHz; or when the carrier frequency is greater than 3 GHz and less than or equal to 6 GHz, the subcarrier spacing is equal to 30 kHz.

In a second possible implementation, the first device determines a carrier frequency set corresponding to the serving cell, and determines, based on the carrier frequency set, a subcarrier spacing set corresponding to the serving cell.

The first device determines the subcarrier spacing of the serving cell based on the subcarrier spacing set corresponding to the serving cell.

In this embodiment of this disclosure, when the first device determines the carrier frequency set corresponding to the serving cell, the first device determines, based on a preset correspondence between a carrier frequency set and a subcarrier spacing set, the subcarrier spacing set corresponding to the carrier frequency set of the serving cell, so as to determine the subcarrier spacing of the serving cell based on the subcarrier spacing set.

For example, the correspondence between a carrier frequency set and a subcarrier spacing set may be as follows:

When a carrier frequency included in the carrier frequency set corresponding to the serving cell is less than or equal to 6 GHz, the subcarrier spacing set corresponding to the serving cell includes a subcarrier spacing 1 and a subcarrier spacing 2. Optionally, the subcarrier spacing 1 is 15 kHz, and the subcarrier spacing 2 is 30 kHz.

Alternatively, when a carrier frequency included in the carrier frequency set corresponding to the serving cell is greater than 6 GHz and less than or equal to 40 GHz, the subcarrier spacing set corresponding to the serving cell includes a subcarrier spacing 2 and a subcarrier spacing 3. Optionally, the subcarrier spacing 2 is 30 kHz, and the subcarrier spacing 3 is 60 kHz.

Alternatively, when a carrier frequency included in the carrier frequency set corresponding to the serving cell is greater than 40 GHz and less than or equal to 80 GHz, the subcarrier spacing set corresponding to the serving cell includes a subcarrier spacing 4 and a subcarrier spacing 5. Optionally, the subcarrier spacing 4 is 60 kHz, and the subcarrier spacing 5 is 120 kHz.

Alternatively, when a carrier frequency included in the carrier frequency set corresponding to the serving cell is greater than 80 GHz, the subcarrier spacing set corresponding to the serving cell includes a subcarrier spacing 6 and a subcarrier spacing 7. Optionally, the subcarrier spacing 6 is 120 kHz, and the subcarrier spacing 7 is 240 kHz.

Certainly, the correspondence between a carrier frequency set and a subcarrier spacing set is merely an example. In this embodiment of this disclosure, the correspondence between a carrier frequency set and a subcarrier spacing set may be in another form. This embodiment of this disclosure imposes no limitation thereto.

A 5G communications system needs to meet requirements of different services, different deployment scenarios, and different spectrums. If different services and different scenarios are supported in a same serving cell, coexistence of different system parameters in the same serving cell needs to be supported. In this case, different bandwidth parts in the same serving cell support different subcarrier spacing. Correspondingly, the first device respectively determines subcarrier spacing corresponding to the different bandwidth parts of the serving cell.

Optionally, the subcarrier spacing of the serving cell belongs to a first subcarrier spacing set, and the first subcarrier spacing set includes a first subcarrier spacing and a second subcarrier spacing. Both the first subcarrier spacing and the second subcarrier spacing are multiples of 15 kHz, and the first subcarrier spacing is less than the second subcarrier spacing. Optionally, the second subcarrier spacing is two times the first subcarrier spacing. Optionally, step S101 may include: determining, by the first device, a subcarrier spacing corresponding to a first bandwidth part in the serving cell, and determining a subcarrier spacing corresponding to a second bandwidth part in the serving cell. The subcarrier spacing corresponding to the first bandwidth part is the first subcarrier spacing, and the subcarrier spacing corresponding to the second bandwidth part is the second subcarrier spacing. A frequency resource occupied by the first bandwidth part is different from a frequency resource occupied by the second bandwidth part. Different subcarrier spacing are deployed for the different bandwidth parts of the serving cell, so that users in different disclosure scenarios can be served simultaneously by using more matched subcarrier spacing, thereby improving system performance. For example, (a) for user equipment with a large delay spread, the user equipment may be scheduled to the bandwidth part corresponding to the first subcarrier spacing; and (b) for high-speed user equipment, the user equipment may be scheduled to the bandwidth part corresponding to the second subcarrier spacing. Optionally, when the carrier frequency is less than or equal to 6 GHz, the corresponding first subcarrier spacing set may include 15 kHz and 30 kHz, where 30 kHz may be used in a high-speed scenario up to 500 km/h, and 15 kHz may be used in a scenario in which a delay spread is approximately up to 5 µs.

In step S102 in this embodiment of this disclosure, optionally, the first device may determine a parameter of the resource unit of the serving cell based on the subcarrier spacing of the serving cell, and determine the resource unit of the serving cell based on the parameter of the resource unit. The parameter of the resource unit includes at least one of a length of the resource unit, a quantity of symbols included in the resource unit, a quantity of subcarriers included in the resource unit, an effective symbol length of a symbol included in the resource unit, and a cyclic prefix (CP) length of a symbol included in the resource unit.

Optionally, the determining, by the first device, a length of the resource unit of the serving cell based on the subcarrier spacing of the serving cell includes:

if the subcarrier spacing of the serving cell is $\Delta f_1$, determining that the length of the resource unit is $$\frac{15}{\Delta f_1} \cdot t_1,$$

where $\Delta f_1 = N_1 \cdot 15$ kHz, $N_1$ is a positive integer greater than or equal to 2, or $N_1$ is a positive integer greater than or equal to 1, and $t_1$ is 1 ms or 0.5 ms. Optionally, the length of the resource unit may be a subframe length or a timeslot length. Optionally, when the length of the resource unit is the subframe length, $t_1$ is 1 ms; or when the length of the resource unit is the timeslot length, $t_1$ is 0.5 ms. For example, when $\Delta f_1 = 30$ kHz, and $t_1$ is 1 ms, the length of the resource unit is 0.5 ms. That is, when the subcarrier spacing of the serving cell is 30 kHz, the subframe length of the serving cell is 0.5 ms. For details, refer to Table 1 (Table 1 is a parameter table of the resource unit). Only some examples are enumerated above. Table 1 further shows the length of the resource unit when the subcarrier spacing has different values. It can be learned that the length of the resource unit is scaled as the subcarrier spacing of the serving cell has different values, so that the resource unit includes a same quantity of symbols when the resource unit corresponds to different subcarrier spacing. It should be noted that a value in Table 1 is merely an example, and is a rounded value. For example, the effective symbol length and the CP length in this embodiment may be approximate to values in Table 1. In addition, an interdependency between parameters in Table 1 is not limited.

TABLE 1

Parameter table of the resource unit

|  | System Parameter 1 | | System Parameter 2 | | System Parameter 3 | | System Parameter 4 | |
| --- | --- | --- | --- | --- | --- | --- | --- | --- |
| Subcarrier Spacing (kHz) | 15 | | 30 | | 60 | | 120 | |
| Subframe Length (ms) | 1 | | 0.5 | | 0.25 | | 0.125 | |
| Symbol Quantity | 14 | 12 | 14 | 12 | 14 | 12 | 14 | 12 |
| Effective Symbol Length (µs) | 66.67 | | 33.33 | | 16.67 | | 8.33 | |
| CP Length (µs) | 4.76 | 16.67 | 2.38 | 8.33 | 1.19 | 4.17 | 0.59 | 2.09 |
| CP Overheads | ~6.7% | ~20% | ~6.7% | ~20% | ~6.7% | ~20% | ~6.7% | ~20% |

Optionally, the determining, by the first device based on the subcarrier spacing of the serving cell, a quantity of symbols included in the resource unit of the serving cell includes:

determining, by the first device based on the subcarrier spacing of the serving cell, that the quantity of symbols included in the resource unit of the serving cell is 14, where the subcarrier spacing of the serving cell is a multiple of 15 kHz.

In this embodiment of this disclosure, the resource unit corresponding to different subcarrier spacing is defined in such a manner that the quantity of symbols included in the resource unit remains unchanged when the resource unit corresponds to different subcarrier spacing, so that a resource location occupied by a channel and/or a signal in the resource unit remains unchanged when the resource unit corresponds to different system parameters.

Optionally, the "symbol included in the resource unit" in this embodiment of this disclosure may be a time domain symbol included in the resource unit, for example, an orthogonal frequency division multiplexing (Orthogonal Frequency Division Multiplexing, OFDM for short) symbol or a single carrier frequency division multiple access (Single Carrier Frequency Division Multiple Access, SC-FDMA for short) symbol. Optionally, the symbol included in the resource unit may have a symbol number. A number of the first symbol in the resource unit is 0, that is, the first symbol in the resource unit is a symbol 0, and by analogy, the $X^{th}$ symbol in the resource unit is a symbol (X−1) in the resource unit.

Optionally, the determining, by the first device based on the subcarrier spacing of the serving cell, a quantity of subcarriers included in the resource unit of the serving cell includes:

determining, by the first device based on the subcarrier spacing of the serving cell, that the quantity of subcarriers included in the resource unit of the serving cell is 12, where the subcarrier spacing of the serving cell is a multiple of 15 kHz; or determining, by the first device based on the subcarrier spacing of the serving cell, that the quantity of subcarriers included in the resource unit of the serving cell is a multiple of 12.

In this embodiment of this disclosure, the resource unit corresponding to different subcarrier spacing is defined in such a manner that the quantity of symbols included in the resource unit remains unchanged when the resource unit corresponds to different subcarrier spacing. For example, the quantity of subcarriers is 12. Alternatively, when the subcarrier spacing of the serving cell has different values, the quantity of subcarriers included in the resource unit corresponding to the subcarrier spacing is a multiple of S1. For example, S1 may be equal to 12 (for example, the resource unit includes 12 subcarriers when the subcarrier spacing of the serving cell is 15 kHz).

In this embodiment of this disclosure, a length of a symbol includes a CP length of the symbol and an effective symbol length of the symbol. Optionally, the determining, by the first device based on the subcarrier spacing of the serving cell, an effective symbol length of a symbol included in the resource unit of the serving cell includes:

if the subcarrier spacing of the serving cell is $\Delta f_1$, determining that the effective symbol length of the symbol included in the resource unit is $$\frac{15}{\Delta f_1} \cdot 2048 \cdot T_s,$$

where $\Delta f_1 = N_1 \cdot 15$ kHz, $N_1$ is a positive integer greater than or equal to 2, or $N_1$ is a positive integer greater than or equal to 1, and $T_s = 1/(15000 \times 2048)$. For example, Table 1 shows the effective symbol length of the symbol included in the resource unit when the subcarrier spacing has different values.

Optionally, the resource unit includes a first normal CP symbol and a second normal CP symbol. The determining, by the first device based on the subcarrier spacing of the serving cell, a cyclic prefix (CP) length of a symbol included in the resource unit of the serving cell includes:

if the subcarrier spacing of the serving cell is $\Delta f_1$, determining that a length of the first normal CP symbol is $$\frac{15}{\Delta f_1} \cdot 160 \cdot T_s,$$

and a length of the second normal CP symbol is $$\frac{15}{\Delta f_1} \cdot 144 \cdot T_s,$$

where $\Delta f_1 = N_1 \cdot 15$ kHz, $N_1$ is a positive integer greater than or equal to 2, or $N_1$ is a positive integer greater than or equal to 1, and $T_s = 1/(15000 \times 2048)$.

Further, the resource unit includes M1 first normal CP symbols and M2 second normal CP symbols, and both M1 and M2 are positive integers. When the subcarrier spacing of the serving cell has different values, values of M1 and M2 remain unchanged. Optionally, when $t_1$ is 1 ms or when the length of the resource unit is the subframe length, M1 is equal to 2, and M2 is equal to 12.

Optionally, a symbol 0 to a symbol (M1−1) in the resource unit are the first normal CP symbols, and a symbol M1 to a symbol (M1+M2−1) in the resource unit are the second normal CP symbols; or a symbol 0 and a symbol ((M1+M2)/2) in the resource unit are the first normal CP symbols, and symbols in the resource unit other than the symbol 0 and the symbol ((M1+M2)/2) are the second normal CP symbols.

Optionally, the subcarrier spacing of the serving cell belongs to a first subcarrier spacing set, and the first subcarrier spacing set includes a first subcarrier spacing and a second subcarrier spacing. Both the first subcarrier spacing and the second subcarrier spacing are multiples of 15 kHz, and the first subcarrier spacing is less than the second subcarrier spacing (for example, the second subcarrier spacing is two times the first subcarrier spacing).

(A) When the subcarrier spacing of the serving cell is the first subcarrier spacing, a symbol 0 and a symbol ((M1+M2)/2) in the resource unit are the first normal CP symbols, and symbols in the resource unit other than the symbol 0 and the symbol ((M1+M2)/2) are the second normal CP symbols.

(B) When the subcarrier spacing of the serving cell is the second subcarrier spacing, a symbol 0 to a symbol (M1−1) in the resource unit are the first normal CP symbols, and a symbol M1 to a symbol (M1+M2−1) in the resource unit are the second normal CP symbols.

Figure 2:
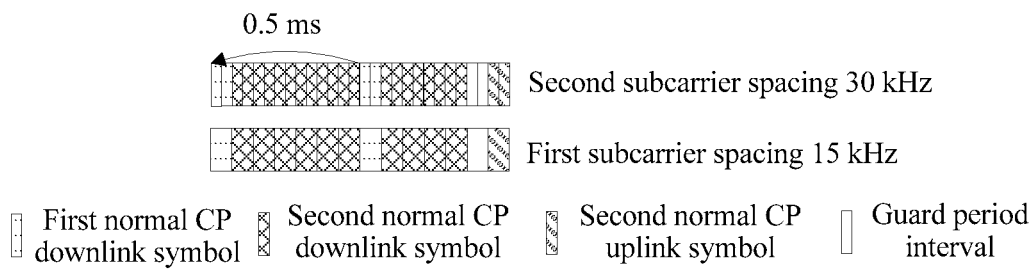
FIG. 2 is a schematic diagram 1 of distribution of a first normal CP symbol and a second normal CP symbol.
Figure 3:
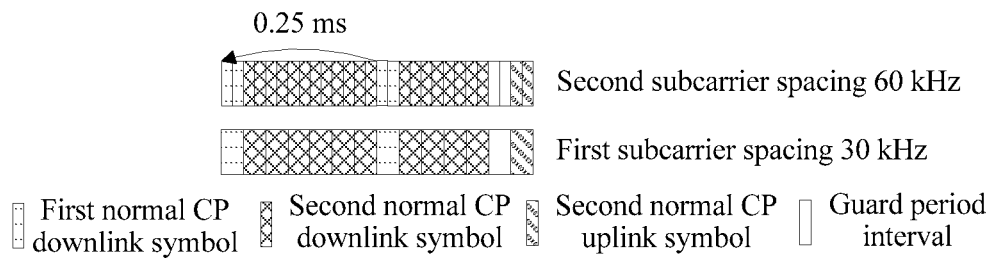
FIG. 3 is a schematic diagram 2 of distribution of a first normal CP symbol and a second normal CP symbol.

Optionally, the first subcarrier spacing corresponds to a first bandwidth part of the serving cell, and the second subcarrier spacing corresponds to a second bandwidth part of the serving cell. For example, (I) when the first subcarrier spacing is 15 kHz, and the second subcarrier spacing is 30 kHz, distribution, shown in FIG. 2, of the first normal CP symbol and the second normal CP symbol in the resource unit may be determined in the foregoing "manner described in (A) and (B)" (FIG. 2 is a schematic diagram 1 of distribution of a first normal CP symbol and a second normal CP symbol); and (II) when the first subcarrier spacing is 30 kHz, and the second subcarrier spacing is 60 kHz, distribution, shown in FIG. 3, of the first normal CP symbol and the second normal CP symbol in the resource unit may be determined in the foregoing "manner described in (A) and (B)" (FIG. 3 is a schematic diagram 2 of distribution of a first normal CP symbol and a second normal CP symbol). The resource unit corresponding to the first subcarrier spacing includes a downlink symbol, a guard period (Guard Period, GP for short), and an uplink symbol. When the length of the resource unit is equal to the subframe length, the resource unit corresponds to a new subframe type that can be referred to as a self-contained subframe type. In this embodiment of this disclosure, when the first bandwidth part is adjacent to the second bandwidth part, the resource unit includes a same quantity of first normal CP symbols when the resource unit corresponds to different subcarrier spacing, and the first normal CP symbol and the second normal CP symbol may be distributed in the manner shown in FIG. 2 or FIG. 3. Therefore, a GP boundary corresponding to the first subcarrier spacing can be aligned with a GP boundary corresponding to the second subcarrier spacing, an uplink symbol boundary corresponding to the first subcarrier spacing can be aligned with an uplink symbol boundary corresponding to the second subcarrier spacing (as shown in FIG. 2 or FIG. 3, total duration occupied by all uplink symbols corresponding to the first subcarrier spacing is the same as total duration occupied by all uplink symbols corresponding to the second subcarrier spacing), and a downlink symbol boundary corresponding to the first subcarrier spacing can be aligned with a downlink symbol boundary corresponding to the second subcarrier spacing, so that a system parameter corresponding to the first subcarrier spacing and a system parameter corresponding to the second subcarrier spacing can efficiently coexist, thereby improving system performance; otherwise, resources are unnecessarily wasted. For example, in the resource unit corresponding to the second subcarrier spacing in FIG. 2, if only a symbol 0 is the first normal CP symbol, an uplink symbol corresponding to the second subcarrier spacing is not aligned with an uplink symbol corresponding to the first subcarrier spacing. In some embodiments, a total length of the uplink symbols corresponding to the second subcarrier spacing is greater than a total length of the uplink symbols corresponding to the first subcarrier spacing, and therefore, an obtained guard period interval of the second subcarrier spacing is relatively short relative to downlink transmission corresponding to the first subcarrier spacing. Consequently, uplink transmission performance of the second subcarrier spacing, especially uplink control information transmission performance, is degraded. A solution is to extend a GP length corresponding to the first subcarrier spacing; however, resources are unnecessarily wasted.

Optionally, when the subcarrier spacing of the serving cell varies, a channel in the resource unit of the serving cell occupies a same resource location, and/or a signal in the resource unit of the serving cell occupies a same resource location (that is, a channel design and/or a signal design in the resource unit of the serving cell are/is the same). To be specific, when the resource unit corresponds to different subcarrier spacings, a signal in the resource unit occupies a same resource location, and/or a channel in the resource unit occupies a same resource location. The channel in this embodiment may include a downlink shared channel and a downlink control channel, and the signal may include a reference signal.

Further, when the subcarrier spacing of the serving cell varies, at same CP overheads, the channel in the resource unit of the serving cell occupies the same resource location, and/or the signal in the resource unit of the serving cell occupies the same resource location. The CP overheads may be a ratio of CP occupation duration to a symbol length, or a ratio of CP occupation duration to an effective symbol length, or may be CP occupation duration divided by a symbol length.

Optionally, when the subcarrier spacing of the serving cell varies in a same subcarrier spacing set, a channel in the resource unit of the serving cell occupies a same resource location, and/or a signal in the resource unit of the serving cell occupies a same resource location. Optionally, all different subcarrier spacings included in the subcarrier spacing set are multiples of 15 kHz.

Further, when the subcarrier spacing of the serving cell varies in the same subcarrier spacing set, at same CP overheads, the channel in the resource unit of the serving cell occupies the same resource location, and/or the signal in the resource unit of the serving cell occupies the same resource location. Optionally, all the different subcarrier spacings included in the subcarrier spacing set are multiples of 15 kHz. Optionally, the subcarrier spacing set corresponds to a specific carrier frequency set, and different subcarrier spacing sets correspond to different carrier frequency sets.

In step S102 in this embodiment of this disclosure, the first device determines the resource unit of the serving cell based on the subcarrier spacing of the serving cell. A parameter corresponding to each resource unit may be referred to as a system parameter corresponding to the subcarrier spacing, and different subcarrier spacing correspond to different system parameters.

In this step, the length of the resource unit is scaled as the subcarrier spacing of the serving cell has different values. Therefore, when the resource unit corresponds to different subcarrier spacing, quantities of symbols included in the resource unit are the same, and quantities of subcarriers included in the resource unit are in a multiple relationship, so that quantities of resource elements (resource element, RE for short) included in the resource unit are the same or are in a multiple relationship when the resource unit corresponds to the different subcarrier spacing. Therefore, uniform channel and signal designs can be used in the resource unit when the resource unit corresponds to the different subcarrier spacings, to reduce complexity. To be specific, the uniform channel and signal designs can be shared by a plurality of sets of system parameters, to reduce complexity.

It should be noted that in this embodiment of this disclosure, unless otherwise specified, a sequence of steps and an interdependency between the steps are not limited.

In conclusion, in this embodiment of this disclosure, the length of the resource unit is scaled as the subcarrier spacing of the serving cell has different values. Therefore, when the resource unit corresponds to different subcarrier spacing, quantities of symbols included in the resource unit are the same, and quantities of subcarriers included in the resource unit are in a multiple relationship, so that uniform channel and signal designs can be used in the resource unit when the resource unit corresponds to the different subcarrier spacing, to reduce complexity. That is, the uniform channel and signal designs can be shared by a plurality of sets of system parameters, to reduce complexity.

Further, the resource unit includes a same quantity of first normal CP symbols when the resource unit corresponds to different subcarrier spacing, and the first normal CP symbol and the second normal CP symbol are distributed in the foregoing manner described in "(A) and (B)" in this embodiment. Therefore, a GP boundary corresponding to the first subcarrier spacing can be aligned with a GP boundary corresponding to the second subcarrier spacing, an uplink symbol boundary corresponding to the first subcarrier spacing can be aligned with an uplink symbol boundary corresponding to the second subcarrier spacing, and a downlink symbol boundary corresponding to the first subcarrier spacing can be aligned with a downlink symbol boundary corresponding to the second subcarrier spacing, so that a system parameter corresponding to the first subcarrier spacing and a system parameter corresponding to the second subcarrier spacing can efficiently coexist, thereby improving system performance.

In Embodiment 3 of an information transmission method in this disclosure, a process in which the subcarrier spacing of the serving cell is a multiple of 17.5 kHz is described in detail on a basis of Embodiment 1.

In this embodiment of this disclosure, optionally, step S101 may be implemented in at least the following manners:

In a first possible implementation, the first device determines a carrier frequency of the serving cell, and determines the subcarrier spacing of the serving cell based on the carrier frequency.

In this embodiment of this disclosure, when the first device determines the carrier frequency of the serving cell, the first device determines, based on a preset correspondence between a carrier frequency and a subcarrier spacing, the subcarrier spacing corresponding to the carrier frequency of the serving cell. For example, the preset correspondence between a carrier frequency and a subcarrier spacing may be as follows: When the carrier frequency is less than or equal to 3 GHz, the subcarrier spacing is equal to 17.5 kHz; or when the carrier frequency is greater than 3 GHz and less than or equal to 6 GHz, the subcarrier spacing is equal to 35 kHz.

In a second possible implementation, the first device determines a carrier frequency set corresponding to the serving cell, and determines, based on the carrier frequency set, a subcarrier spacing set corresponding to the serving cell.

The first device determines the subcarrier spacing of the serving cell based on the subcarrier spacing set corresponding to the serving cell.

In this embodiment of this disclosure, when the first device determines the carrier frequency set corresponding to the serving cell, the first device determines, based on a preset correspondence between a carrier frequency set and a subcarrier spacing set, the subcarrier spacing set corresponding to the carrier frequency set of the serving cell, so as to determine the subcarrier spacing of the serving cell based on the subcarrier spacing set.

For example, the correspondence between a carrier frequency set and a subcarrier spacing set may be as follows:

When a carrier frequency included in the carrier frequency set corresponding to the serving cell is less than or equal to 3 GHz, the subcarrier spacing set corresponding to the serving cell includes a subcarrier spacing 1 and a subcarrier spacing 8. Optionally, the subcarrier spacing 1 is 15 kHz, and the subcarrier spacing 8 is 17.5 kHz.

Alternatively, when a carrier frequency included in the carrier frequency set corresponding to the serving cell is greater than 3 GHz and less than or equal to 6 GHz, the subcarrier spacing set corresponding to the serving cell includes a subcarrier spacing 8 and a subcarrier spacing 9. Optionally, the subcarrier spacing 8 is 17.5 kHz, and the subcarrier spacing 9 is 35 kHz.

Alternatively, when a carrier frequency included in the carrier frequency set corresponding to the serving cell is greater than 6 GHz and less than or equal to 40 GHz, the subcarrier spacing set corresponding to the serving cell includes a subcarrier spacing 9 and a subcarrier spacing 10. Optionally, the subcarrier spacing 9 is 35 kHz, and the subcarrier spacing 10 is 70 kHz.

Alternatively, when a carrier frequency included in the carrier frequency set corresponding to the serving cell is greater than 40 GHz and less than or equal to 80 GHz, the subcarrier spacing set corresponding to the serving cell includes a subcarrier spacing 10 and a subcarrier spacing 11. Optionally, the subcarrier spacing 10 is 70 kHz, and the subcarrier spacing 11 is 140 kHz.

Alternatively, when a carrier frequency included in the carrier frequency set corresponding to the serving cell is greater than 80 GHz, the subcarrier spacing set corresponding to the serving cell includes a subcarrier spacing 12 and a subcarrier spacing 13. Optionally, the subcarrier spacing 12 is 280 kHz, and the subcarrier spacing 13 is 560 kHz.

Certainly, the correspondence between a carrier frequency set and a subcarrier spacing set is merely an example. In this embodiment of this disclosure, the correspondence between a carrier frequency set and a subcarrier spacing set may be in another form. This embodiment of this disclosure imposes no limitation thereto.

A 5G communications system needs to meet requirements of different services, different deployment scenarios, and different spectrums. If different services and different scenarios are supported in a same serving cell, coexistence of different system parameters in the same serving cell needs to be supported. In this case, different bandwidth parts in the same serving cell support different subcarrier spacing. Correspondingly, the first device respectively determines subcarrier spacing corresponding to the different bandwidth parts of the serving cell.

Optionally, a subcarrier spacing set includes different subcarrier spacing, so that appropriate subcarrier spacing can be selected in different scenarios, thereby improving system performance by using a more matched subcarrier spacing. For example, (a) for a large delay spread scenario, a relatively small subcarrier spacing may be selected; and (b) for a high-speed scenario, a relatively large subcarrier spacing may be selected. For example, when the frequency is less than or equal to 6 GHz, a corresponding subcarrier spacing set includes 17.5 kHz and 35 kHz, 35 kHz may be used in a high-speed scenario up to 500 km/h, and 17.5 kHz may be used in a scenario in which a delay spread is approximately up to 5 μs.

In step S102 in this embodiment of this disclosure, optionally, the first device may determine a parameter of the resource unit of the serving cell based on the subcarrier spacing of the serving cell, and determine the resource unit of the serving cell based on the parameter of the resource unit. The parameter of the resource unit includes at least one of a length of the resource unit, a quantity of symbols included in the resource unit, a quantity of subcarriers included in the resource unit, an effective symbol length of a symbol included in the resource unit, and a cyclic prefix (CP) length of a symbol included in the resource unit.

Optionally, the determining, by the first device, a length of the resource unit of the serving cell based on the subcarrier spacing of the serving cell includes:

if the subcarrier spacing of the serving cell is $\Delta f_2$, determining that the length of the resource unit is $$\frac{17.5}{\Delta f_2} \cdot t_2,$$

where $\Delta f_2 = N_2 \cdot 17.5$ kHz, $N_2$ is a positive integer greater than or equal to 1, and $t_2$ is 1 ms or 0.5 ms. Optionally, the length of the resource unit may be a subframe length or a timeslot length. Optionally, when the length of the resource unit is the subframe length, $t_2$ is 1 ms; or when the length of the resource unit is the timeslot length, $t_2$ is 0.5 ms. For example, when $\Delta f_2 = 35$ kHz, and $t_2$ is 1 ms, the length of the resource unit is 0.5 ms. To be specific, when the subcarrier spacing of the serving cell is 35 kHz, the subframe length of the serving cell is 0.5 ms. For details, refer to Table 2 (Table 2 is a parameter table 2 of the resource unit). Only some examples are enumerated above. Table 2 further shows the length of the resource unit when the subcarrier spacing has different values. It can be learned that the length of the resource unit is scaled as the subcarrier spacing of the serving cell has different values, so that the resource unit includes a same quantity of symbols when the resource unit corresponds to different subcarrier spacing. It should be noted that a value in Table 2 is merely an example, and is a rounded value. For example, the effective symbol length and the CP length in this embodiment may be approximate to values in Table 2. In addition, an interdependency between parameters in Table 2 is not limited.

TABLE 2

| | System Parameter 5 | | System Parameter 6 | | System Parameter 7 | | System Parameter 8 | |
|---|---|---|---|---|---|---|---|---|
| Subcarrier Spacing (kHz) | 17.5 | | 35 | | 70 | | 140 | |
| Subframe Length (ms) | 1 | 1.0 | 0.5 | 0.5 | 0.25 | | 0.125 | 0.125 |
| Symbol Quantity | 16 | 14 | 16 | 14 | 16 | 14 | 16 | 14 |
| Effective Symbol Length (µs) | 57.14 | | 28.57 | | 14.285 | | 7.14 | |
| CP Length (µs) | 5.36 | 14.3 | 2.68 | 7.15 | 1.34 | 3.575 | 0.67 | 1.7875 |
| CP Overheads | ~8.6% | ~20% | ~8.6% | ~20% | ~8.6% | ~20% | ~8.6% | ~20% |

Optionally, the determining, by the first device based on the subcarrier spacing of the serving cell, a quantity of symbols included in the resource unit of the serving cell includes:

determining, by the first device based on the subcarrier spacing of the serving cell, that the quantity of symbols included in the resource unit of the serving cell is 16, where the subcarrier spacing of the serving cell is a multiple of 17.5 kHz.

In this embodiment of this disclosure, the resource unit corresponding to different subcarrier spacing is defined in such a manner that the quantity of symbols included in the resource unit remains unchanged when the resource unit corresponds to different subcarrier spacing, so that a resource location occupied by a channel and/or a signal in the resource unit remains unchanged when the resource unit corresponds to different system parameters.

Optionally, the "symbol included in the resource unit" in this embodiment of this disclosure may be a time domain symbol included in the resource unit, for example, an OFDM symbol or an SC-FDMA symbol. Optionally, the symbol included in the resource unit may have a symbol number. A number of the first symbol in the resource unit is 0, that is, the first symbol in the resource unit is a symbol 0, and by analogy, the $X^{th}$ symbol in the resource unit is a symbol (X-1) in the resource unit.

Optionally, the determining, by the first device based on the subcarrier spacing of the serving cell, a quantity of subcarriers included in the resource unit of the serving cell includes:

determining, by the first device based on the subcarrier spacing of the serving cell, that the quantity of subcarriers included in the resource unit of the serving cell is 16, where the subcarrier spacing of the serving cell is a multiple of 17.5 kHz; or determining, by the first device based on the subcarrier spacing of the serving cell, that the quantity of subcarriers included in the resource unit of the serving cell is a multiple of 16.

In this embodiment of this disclosure, the resource unit corresponding to different subcarrier spacing is defined in such a manner that the quantity of symbols included in the resource unit remains unchanged when the resource unit corresponds to different subcarrier spacing. For example, the quantity of subcarriers is 12, 16, or 8. Alternatively, when the subcarrier spacing of the serving cell has different values, the quantity of subcarriers included in the resource unit corresponding to the subcarrier spacing is a multiple of S2. For example, S2 may be equal to 16 (for example, the resource unit includes 16 subcarriers when the subcarrier spacing of the serving cell is 17.5 kHz).

In this embodiment of this disclosure, a length of a symbol includes a CP length of the symbol and an effective symbol length of the symbol. Optionally, the determining, by the first device based on the subcarrier spacing of the serving cell, an effective symbol length of a symbol included in the resource unit of the serving cell includes:

if the subcarrier spacing of the serving cell is $\Delta f_2$, determining that the effective symbol length of the symbol included in the resource unit is $$\frac{17.5}{\Delta f_2} \cdot T_{symbol},$$

where $\Delta f_2 = N_2 \cdot 17.5$ kHz, $N_2$ is a positive integer greater than or equal to 1, and $T_{symbol}$ is the effective symbol length of the symbol included in the resource unit when the subcarrier spacing of the serving cell is 17.5 kHz. Optionally, $T_{symbol}$ is equal to 1/17500 s. For example, Table 2 shows the effective symbol length of the symbol included in the resource unit when the subcarrier spacing has different values.

Optionally, the determining, by the first device based on the subcarrier spacing of the serving cell, a cyclic prefix (CP) length of a symbol included in the resource unit of the serving cell includes:

if the subcarrier spacing of the serving cell is $\Delta f_2$, determining that the cyclic prefix (CP) length of the symbol included in the resource unit is $$\frac{17.5}{\Delta f_2} \cdot T_{CP},$$

where $\Delta f_2 = N_2 \cdot 17.5$ kHz, $N_2$ is a positive integer greater than or equal to 1, and $T_{CP}$ is the CP length of the symbol included in the resource unit when the subcarrier spacing of the serving cell is 17.5 kHz. Optionally, $T_{CP}$ is equal to 5.36 µs.

Further, the resource unit includes a third normal CP symbol and a fourth normal CP symbol. Optionally, a length of the third normal CP symbol is greater than a length of the fourth normal CP symbol. Optionally, there are M3 third normal CP symbols and M4 fourth normal CP symbols, and both M3 and M4 are positive integers. When the subcarrier spacing of the serving cell has different values, values of M3 and M4 remain unchanged.

Optionally, a symbol 0 to a symbol (M3−1) in the resource unit are the third normal CP symbols, and a symbol M3 to a symbol (M3+M4−1) in the resource unit are the fourth normal CP symbols; or a symbol 0 and a symbol ((M3+M4)/2) in the resource unit are the third normal CP symbols, and symbols in the resource unit other than the symbol 0 and the symbol ((M3+M4)/2) are the fourth normal CP symbols.

Optionally, the subcarrier spacing of the serving cell belongs to a second subcarrier spacing set, and the second subcarrier spacing set includes a third subcarrier spacing and a fourth subcarrier spacing. Both the third subcarrier spacing and the fourth subcarrier spacing are multiples of 17.5 kHz, and the third subcarrier spacing is less than the fourth subcarrier spacing (for example, the fourth subcarrier spacing is two times the third subcarrier spacing).

(A) When the subcarrier spacing of the serving cell is the third subcarrier spacing, a symbol 0 and a symbol ((M3+M4)/2) in the resource unit are the third normal CP symbols, and symbols in the resource unit other than the symbol 0 and the symbol ((M3+M4)/2) are the fourth normal CP symbols.

(B) When the subcarrier spacing of the serving cell is the fourth subcarrier spacing, a symbol 0 to a symbol (M3−1) in the resource unit are the third normal CP symbols, and a symbol M3 to a symbol (M3+M4−1) in the resource unit are the fourth normal CP symbols.

Optionally, the third subcarrier spacing corresponds to a first bandwidth part of the serving cell, and the fourth subcarrier spacing corresponds to a second bandwidth part of the serving cell. For example, when the third subcarrier spacing is 17.5 kHz, and the fourth subcarrier spacing is 35 kHz, distribution of the third normal CP symbol and the fourth normal CP symbol in the resource unit may be determined in the foregoing "manner described in (A) and (B)" in this embodiment. In this embodiment of this disclosure, when the first bandwidth part is adjacent to the second bandwidth part, the resource unit includes a same quantity of third normal CP symbols when the resource unit corresponds to different subcarrier spacing, and the distribution of the third normal CP symbol and the fourth normal CP symbol is determined in the foregoing "manner described in (A) and (B)" in this embodiment. Therefore, a GP boundary corresponding to the third subcarrier spacing can be aligned with a GP boundary corresponding to the fourth subcarrier spacing, an uplink symbol boundary corresponding to the third subcarrier spacing can be aligned with an uplink symbol boundary corresponding to the fourth subcarrier spacing, and a downlink symbol boundary corresponding to the third subcarrier spacing can be aligned with a downlink symbol boundary corresponding to the fourth subcarrier spacing, so that a system parameter corresponding to the third subcarrier spacing and a system parameter corresponding to the fourth subcarrier spacing can efficiently coexist, thereby improving system performance.

Optionally, when the subcarrier spacing of the serving cell varies, a channel in the resource unit of the serving cell occupies a same resource location, and/or a signal in the resource unit of the serving cell occupies a same resource location (that is, a channel design and/or a signal design in the resource unit of the serving cell are/is the same). To be specific, when the resource unit corresponds to different subcarrier spacing, a signal in the resource unit occupies a same resource location, and/or a channel in the resource unit occupies a same resource location. The channel in this embodiment may include a downlink shared channel and a downlink control channel, and the signal may include a reference signal.

Further, when the subcarrier spacing of the serving cell varies, at same CP overheads, the channel in the resource unit of the serving cell occupies the same resource location, and/or the signal in the resource unit of the serving cell occupies the same resource location.

Optionally, when the subcarrier spacing of the serving cell varies in a same subcarrier spacing set, a channel in the resource unit of the serving cell occupies a same resource location, and/or a signal in the resource unit of the serving cell occupies a same resource location. Optionally, all different subcarrier spacing included in the subcarrier spacing set are multiples of 17.5 kHz.

Further, when the subcarrier spacing of the serving cell varies in the same subcarrier spacing set, at same CP overheads, the channel in the resource unit of the serving cell occupies the same resource location, and/or the signal in the resource unit of the serving cell occupies the same resource location. Optionally, all the different subcarrier spacing included in the subcarrier spacing set are multiples of 17.5 kHz. Optionally, the subcarrier spacing set corresponds to a specific carrier frequency set, and different subcarrier spacing sets correspond to different carrier frequency sets.

In step S102 in this embodiment of this disclosure, the first device determines the resource unit of the serving cell based on the subcarrier spacing of the serving cell. A parameter corresponding to each resource unit may be referred to as a system parameter corresponding to the subcarrier spacing, and different subcarrier spacing correspond to different system parameters.

In this step, the length of the resource unit is scaled as the subcarrier spacing of the serving cell has different values. Therefore, when the resource unit corresponds to different subcarrier spacing, quantities of symbols included in the resource unit are the same, and quantities of subcarriers included in the resource unit are in a multiple relationship, so that quantities of REs included in the resource unit are the same or are in a multiple relationship when the resource unit corresponds to the different subcarrier spacing. Therefore, uniform channel and signal designs can be used in the resource unit when the resource unit corresponds to the different subcarrier spacing, to reduce complexity. That is, the uniform channel and signal designs can be shared by a plurality of sets of system parameters, to reduce complexity.

It should be noted that in this embodiment of this disclosure, unless otherwise specified, a sequence of steps and an interdependency between the steps are not limited.

In conclusion, in this embodiment of this disclosure, the length of the resource unit is scaled as the subcarrier spacing of the serving cell has different values. Therefore, when the resource unit corresponds to different subcarrier spacing, quantities of symbols included in the resource unit are the same, and quantities of subcarriers included in the resource unit are in a multiple relationship, so that uniform channel and signal designs can be used in the resource unit when the resource unit corresponds to the different subcarrier spacing, to reduce complexity.

Optionally, the subcarrier spacing of the serving cell in this embodiment of this disclosure may be a multiple of 16.875 kHz. Specifically, implementations of step S101 to step S103 may be similar to an implementation in Embodiment 2 in which "the subcarrier spacing of the serving cell is a multiple of 17.5 kHz", provided that 17.5 kHz in Embodiment 2 is replaced with 16.875 kHz, and Table 2 is replaced with Table 3 (Table 3 is a parameter table 3 of the resource unit). Details are not described herein again. It should be noted that a value in Table 3 is merely an example, and is a rounded value. For example, the effective symbol length and the CP length in this embodiment may be approximate to values in Table 3. In addition, an interdependency between parameters in Table 3 is not limited.

TABLE 3

| Parameter table 3 of the resource unit | | | | | | | |
|---|---|---|---|---|---|---|---|
| | System Parameter 9 | | System Parameter 10 | | System Parameter 11 | | System Parameter 12 |
| Subcarrier Spacing (kHz) | 16.875 | | 33.75 | | 67.5 | | 135 |
| Subframe Length (ms) | 1 | 1.0 | 0.5 | 0.5 | 0.25 | | 0.125 0.125 |
| Symbol Quantity | 16 | 14 | 16 | 14 | 16 | 14 | 16 14 |
| Effective Symbol Length (μs) | 59.26 | | 29.63 | | 14.82 | | 7.41 |
| CP Length (μs) | 3.24 | 24 | 1.62 | 12 | 0.81 | 8 | 0.4 3 |
| CP Overheads | ~5.1% | ~28.8% | ~5.1% | ~28.8% | ~5.1% | ~28.8% | ~5.1% ~28.8% |

Figure 4:
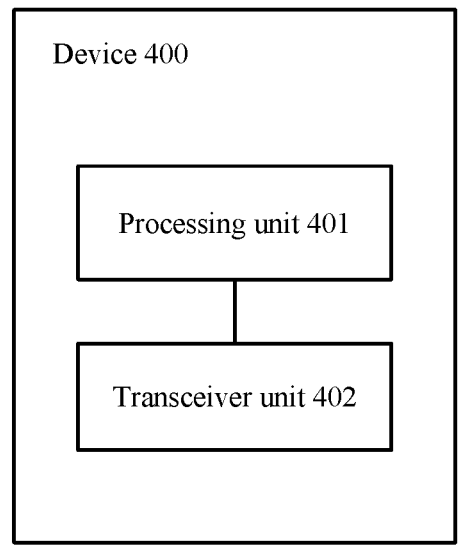
FIG. 4 is a schematic structural diagram of Embodiment 1 of a device according to this disclosure.

FIG. 4 is a schematic structural diagram of Embodiment 1 of a device according to this disclosure. Optionally, the device is a first device. As shown in FIG. 4, the device 400 provided in this embodiment includes a processing unit 401 and a transceiver unit 402.

The processing unit 401 is configured to: determine a subcarrier spacing of a serving cell; and determine a resource unit of the serving cell based on the subcarrier spacing of the serving cell.

The transceiver unit 402 is configured to send information to a second device in the serving cell based on the resource unit of the serving cell determined by the processing unit, or receive, in the serving cell based on the resource unit of the serving cell determined by the processing unit, information sent by the second device.

In this embodiment of this disclosure, when the processing unit 401 is configured to determine the subcarrier spacing of the serving cell, there may be two implementations used as an example. Refer to description of step S101 in the foregoing method embodiment, and details are not described herein again.

In this embodiment of this disclosure, when the transceiver unit 402 is configured to send the information to the second device in the serving cell based on the resource unit of the serving cell, or receive, in the serving cell based on the resource unit of the serving cell, the information sent by the second device, refer to description of step S103 in the foregoing method embodiment, and details are not described herein again.

Optionally, the processing unit 401 is configured to determine a parameter of the resource unit of the serving cell based on the subcarrier spacing of the serving cell, where the parameter of the resource unit includes at least one of a length of the resource unit, a quantity of symbols included in the resource unit, a quantity of subcarriers included in the resource unit, an effective symbol length of a symbol included in the resource unit, and a cyclic prefix (CP) length of a symbol included in the resource unit.

Optionally, the processing unit 401 is specifically configured to: if the subcarrier spacing of the serving cell is $\Delta f_1$, determine that the length of the resource unit is $$\frac{15}{\Delta f_1} \cdot t_1,$$

where $\Delta f_1 = N_1 \cdot 15$ kHz, $N_1$ is a positive integer greater than or equal to 2, and $t_1$ is 1 ms.

Optionally, the processing unit 401 is specifically configured to determine, based on the subcarrier spacing of the serving cell, that the quantity of symbols included in the resource unit of the serving cell is 14, where the subcarrier spacing of the serving cell is a multiple of 15 kHz.

Optionally, the processing unit 401 is specifically configured to:

determine, based on the subcarrier spacing of the serving cell, that the quantity of subcarriers included in the resource unit of the serving cell is 12, where the subcarrier spacing of the serving cell is a multiple of 15 kHz; or determine, based on the subcarrier spacing of the serving cell, that the quantity of subcarriers included in the resource unit of the serving cell is a multiple of 12.

Optionally, the processing unit 401 is specifically configured to: if the subcarrier spacing of the serving cell is $\Delta f_1$, determine that the effective symbol length of the symbol included in the resource unit is $$\frac{15}{\Delta f_1} \cdot 2048 \cdot T_s,$$

where $\Delta f_1 = N_1 \cdot 15$ kHz, $N_1$ is a positive integer greater than or equal to 2 and $T_s = 1/(15000 \times 2048)$.

Optionally, the resource unit includes a first normal CP symbol and a second normal CP symbol, and the processing unit 401 is specifically configured to:

if the subcarrier spacing of the serving cell is $\Delta f_1$, determine that a length of the first normal CP symbol is $$\frac{15}{\Delta f_1} \cdot 160 \cdot T_s,$$

and a length of the second normal CP symbol is $$\frac{15}{\Delta f_1} \cdot 144 \cdot T_s,$$

where $\Delta f_1 = N_1 \cdot 15$ kHz, $N_1$ is a positive integer greater than or equal to 2, and $T_s = 1/(15000 \times 2048)$.

Optionally, the resource unit includes M1 first normal CP symbols and M2 second normal CP symbols, both M1 and M2 are positive integers, and when the subcarrier spacing of the serving cell has different values, values of M1 and M2 remain unchanged.

Optionally, M1 is equal to 2, and M2 is equal to 12.

Optionally, a symbol 0 to a symbol (M1−1) in the resource unit are the first normal CP symbols, and a symbol M1 to a symbol (M1+M2−1) in the resource unit are the second normal CP symbols; or a symbol 0 and a symbol ((M1+M2)/2) in the resource unit are the first normal CP symbols, and symbols in the resource unit other than the symbol 0 and the symbol ((M1+M2)/2) are the second normal CP symbols.

Optionally, the subcarrier spacing of the serving cell belongs to a first subcarrier spacing set, and the first subcarrier spacing set includes a first subcarrier spacing and a second subcarrier spacing. Both the first subcarrier spacing and the second subcarrier spacing are multiples of 15 kHz, and the first subcarrier spacing is less than the second subcarrier spacing.

When the subcarrier spacing of the serving cell is the first subcarrier spacing, a symbol 0 and a symbol ((M1+M2)/2) in the resource unit are the first normal CP symbols, and symbols in the resource unit other than the symbol 0 and the symbol ((M1+M2)/2) are the second normal CP symbols; or when the subcarrier spacing of the serving cell is the second subcarrier spacing, a symbol 0 to a symbol (M1−1) in the resource unit are the first normal CP symbols, and a symbol M1 to a symbol (M1+M2−1) in the resource unit are the second normal CP symbols.

Optionally, the second subcarrier spacing is two times the first subcarrier spacing.

Optionally, the processing unit 401 is specifically configured to: determine a subcarrier spacing corresponding to a first bandwidth part in the serving cell, and determine a subcarrier spacing corresponding to a second bandwidth part in the serving cell, where the subcarrier spacing corresponding to the first bandwidth part is the first subcarrier spacing, and the subcarrier spacing corresponding to the second bandwidth part is the second subcarrier spacing.

In this embodiment of this disclosure, when the processing unit 401 is configured to determine the resource unit of the serving cell based on the subcarrier spacing of the serving cell, refer to description of step S102 in the foregoing Method Embodiment 2, and details are not described herein again.

Optionally, the processing unit 401 is specifically configured to: if the subcarrier spacing of the serving cell is $\Delta f_2$, determine that the length of the resource unit is $$\frac{17.5}{\Delta f_2} \cdot t_2,$$

where $\Delta f_2 = N_2 \cdot 17.5$ kHz, $N_2$ is a positive integer greater than or equal to 1, and $t_2$ is 1 ms.

Optionally, the processing unit 401 is specifically configured to determine, based on the subcarrier spacing of the serving cell, that the quantity of symbols included in the resource unit of the serving cell is 16, where the subcarrier spacing of the serving cell is a multiple of 17.5 kHz.

Optionally, the processing unit 401 is specifically configured to:

determine, based on the subcarrier spacing of the serving cell, that the quantity of subcarriers included in the resource unit of the serving cell is 16, where the subcarrier spacing of the serving cell is a multiple of 17.5 kHz; or determine, based on the subcarrier spacing of the serving cell, that the quantity of subcarriers included in the resource unit of the serving cell is a multiple of 16.

Optionally, the processing unit 401 is specifically configured to: if the subcarrier spacing of the serving cell is $\Delta f_2$, determine that the effective symbol length of the symbol included in the resource unit is $$\frac{17.5}{\Delta f_2} \cdot T_{symbol},$$

where $\Delta f_2 = N_2 \cdot 17.5$ kHz, $N_2$ is a positive integer greater than or equal to 1, and $T_{symbol}$ is the effective symbol length of the symbol included in the resource unit when the subcarrier spacing of the serving cell is 17.5 kHz.

Optionally, $T_{symbol}$ is equal to $1/17500$ s.

Optionally, the processing unit 401 is specifically configured to: if the subcarrier spacing of the serving cell is $\Delta f_2$, determine that the cyclic prefix (CP) length of the symbol included in the resource unit is $$\frac{17.5}{\Delta f_2} \cdot T_{CP},$$

where $\Delta f_2 = N_2 \cdot 17.5$ kHz, $N_2$ is a positive integer greater than or equal to 1, and $T_{CP}$ is the CP length of the symbol included in the resource unit when the subcarrier spacing of the serving cell is 17.5 kHz.

Optionally, $T_{CP}$ is equal to 5.36 µs.

In this embodiment of this disclosure, when the processing unit 401 is configured to determine the resource unit of the serving cell based on the subcarrier spacing of the serving cell, refer to description of step S102 in the foregoing Method Embodiment 3, and details are not described herein again.

Optionally, when the subcarrier spacing of the serving cell varies, a channel in the resource unit of the serving cell occupies a same resource location, and/or a signal in the resource unit of the serving cell occupies a same resource location; or when the subcarrier spacing of the serving cell varies in a same subcarrier spacing set, a channel in the resource unit of the serving cell occupies a same resource location, and/or a signal in the resource unit of the serving cell occupies a same resource location.

Optionally, all different subcarrier spacing included in the subcarrier spacing set are multiples of 15 kHz or a multiple of 17.5 kHz.

Optionally, the subcarrier spacing set corresponds to a specific carrier frequency set, and different subcarrier spacing sets correspond to different carrier frequency sets.

Optionally, the length of the resource unit is a subframe length.

The device in this embodiment may be configured to execute the technical solution in any embodiment of the information transmission method of this disclosure, and implementation principles and technical effects of the device are similar and are not described herein again.

Optionally, in this embodiment of this disclosure, the processing unit 401 may be implemented by a processor, and the transceiver unit 402 may be implemented by a transceiver.

Figure 5:
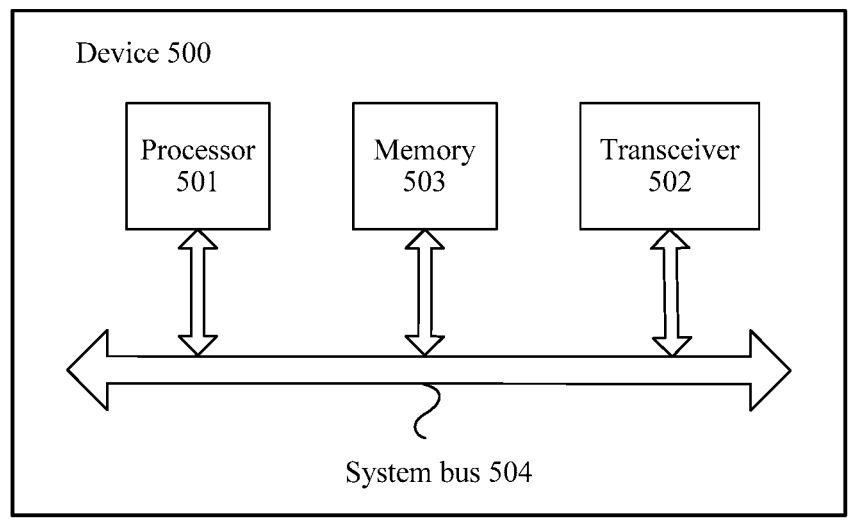
FIG. 5 is a schematic structural diagram of Embodiment 2 of a device according to this disclosure.

FIG. 5 is a schematic structural diagram of Embodiment 2 of a device according to this disclosure. Optionally, the device is a first device. As shown in FIG. 5, the device 500 may include a processor 501, a transceiver 502, and a memory 503. The memory 503 may be configured to store code or the like executed by the processor 501. Optionally, components of the device 500 are coupled together by using a bus system 504. In addition to a data bus, the bus system 504 includes a power bus, a control bus, and a status signal bus.

In the several embodiments provided in this disclosure, it should be understood that the disclosed apparatus and method may be implemented in other manners. For example, the described apparatus embodiment is merely an example.

For example, the unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. Some or all of the units may be selected according to actual requirements to achieve the objectives of the solutions of the embodiments.

In addition, functional units in the embodiments of this disclosure may be integrated into one processing unit, or each of the units may exist alone physically, or two or more units are integrated into one unit. The integrated unit may be implemented in a form of hardware, or may be implemented in a form of hardware in addition to a software functional unit.

When the foregoing integrated unit is implemented in a form of a software functional unit, the integrated unit may be stored in a computer-readable storage medium. The software function unit is stored in a storage medium and includes several instructions for instructing a computer device (which may be a personal computer, a server, a network device, or the like) or a processor to perform a part of the steps of the methods described in the embodiments of this disclosure. The foregoing storage medium includes: any medium that can store program code, such as a USB flash drive, a removable hard disk, a read-only memory (ROM), a random access memory (RAM), a magnetic disk, or an optical disc.

It may be understood by a person skilled in the art that, for the purpose of convenient and brief description, division of the foregoing function modules is taken as an example for illustration. In actual disclosure, the foregoing functions can be allocated to different function modules and implemented according to a requirement, that is, an inner structure of an apparatus is divided into different function modules to implement all or part of the functions described above. For a detailed working process of the foregoing apparatus, reference may be made to a corresponding process in the foregoing method embodiments, and details are not described herein again.

A person of ordinary skill in the art may understand that various numbers in this specification such as first or second are merely used for ease of distinction, and are not intended to limit the scope of the embodiments of this disclosure.

A person of ordinary skill in the art may understand that sequence numbers of the foregoing processes do not mean execution sequences in various embodiments of this disclosure. The execution sequences of the processes should be determined based on functions and internal logic of the processes, and should not be construed as any limitation on the implementation processes of the embodiments of this disclosure.

A person of ordinary skill in the art may understand that all or some of the steps of the method embodiments may be implemented by a program instructing relevant hardware. The program may be stored in a computer-readable storage medium. When the program runs, the steps of the method embodiments are performed. The foregoing storage medium includes: any medium that can store program code, such as a ROM, a RAM, a magnetic disk, or an optical disc.

What is claimed is:

1. An information transmission method, comprising: determining, by a first device, a subcarrier spacing of a serving cell based on a
   correspondence between a carrier frequency and a subcarrier spacing, or a correspondence
   between a carrier frequency set and a subcarrier spacing set:
      determining, by the first device, a resource unit of the serving cell based on the subcarrier spacing of the serving cell; and
      sending, by the first device, information to a second device in the serving cell based on the resource unit of the serving cell, or receiving, in the serving cell based on the resource unit of the serving cell, information sent by the second device
      wherein determining, by the first device, the resource unit of the serving cell based on the subcarrier spacing of the serving cell comprises:
      determining, by the first device, a parameter of the resource unit of the serving cell based on the subcarrier spacing of the serving cell, wherein the parameter of the resource unit comprises at least one of a length of the resource unit, a quantity of symbols in the resource unit, a quantity of subcarriers in the resource unit, an effective symbol length of a symbol in the resource unit, or a cyclic prefix (CP) length of a symbol in the resource unit.

2. The method according to claim 1, wherein determining, by the first device, the length of the resource unit of the serving cell based on the subcarrier spacing of the serving cell comprises:
   when the subcarrier spacing of the serving cell is $\Delta f_1$, determining that the length of the
   resource unit is $15/\Delta f_1 \cdot T$, wherein $\Delta f_1 = N_1 \cdot 15$ kHz, $N_1$ is a positive integer greater than or equal to 2, and $T_s = 1$ ms.

3. The method according to claim 1, wherein determining, by the first device based on the subcarrier spacing of the serving cell, a quantity of symbols comprised in the resource unit of the serving cell comprises:
   determining, by the first device based on the subcarrier spacing of the serving cell, that the quantity of symbols in the resource unit of the serving cell is 14, wherein the subcarrier spacing of the serving cell is a multiple of 15 kHz.

4. The method according to claim 1, wherein determining, by the first device based on the subcarrier spacing of the serving cell, the quantity of subcarriers in the resource unit of the serving cell comprises:
   determining, by the first device based on the subcarrier spacing of the serving cell, that the quantity of subcarriers in the resource unit of the serving cell is 12, wherein the subcarrier spacing of the serving cell is a multiple of 15 kHz; or
   determining, by the first device based on the subcarrier spacing of the serving cell, that the quantity of subcarriers in the resource unit of the serving cell is a multiple of 12.

5. The method according to claim 1, wherein determining, by the first device based on the subcarrier spacing of the serving cell, the effective symbol length of a symbol comprised in the resource unit of the serving cell comprises:
   when the subcarrier spacing of the serving cell is $\Delta f_1$, determining that the effective symbol length of the symbol in the resource unit is $15/\Delta f_1 \cdot 2048 \cdot T_s$,
wherein $\Delta f_1 = N_1 \cdot 15$ kHz, $N_1$ is a positive integer greater than or equal to 2, and $T_s = 1/(15000 \times 2048)$.

6. The method according to claim 1, wherein the resource unit comprises a first normal CP symbol and a second normal CP symbol, and determining, by the first device based on the subcarrier spacing of the serving cell, the cyclic prefix (CP) length of a symbol in the resource unit of the serving cell comprises:
when the subcarrier spacing of the serving cell is $\Delta f_1$, determining that a length of the
first normal CP symbol is $15/\Delta f_1 \cdot 160 \cdot T_s$, and a length of the second normal CP symbol is
$15/\Delta f_1 \cdot 144 \cdot T_s$, wherein $\Delta f_1 = N_1 \cdot 15$ kHz, $N_1$ is a positive integer greater than or equal to 2, and
$T_s = 1/(15000 \times 2048)$.

7. The method according to claim 6, wherein the resource unit comprises M1 first normal CP symbols and M2 second normal CP symbols, both M1 and M2 are positive integers, and when the subcarrier spacing of the serving cell has different values, values of M1 and M2 remain unchanged.

8. The method according to claim 7, wherein M1 is equal to 2, and M2 is equal to 12.

9. A device, wherein the device is a first device, and the device comprises:
a processor, configured to: determine a subcarrier spacing of a serving cell based on a correspondence between a carrier frequency and a subcarrier spacing, or a correspondence
between a carrier frequency set and a subcarrier spacing set: and determine a resource unit of the serving cell based on the subcarrier spacing of the serving cell; and
a transceiver, configured to send information to a second device in the serving cell based on the resource unit of the serving cell determined by the processor, or receive, in the serving cell based on the resource unit of the serving cell determined by the processor, information sent by the second device;
wherein the processor is configured to determine a parameter of the resource unit of the serving cell based on the subcarrier spacing of the serving cell, wherein the parameter of the resource unit comprises at least one of a length of the resource unit, a quantity of symbols in the resource unit, a quantity of subcarriers comprised in the resource unit, an effective symbol length of a symbol in the resource unit, and a cyclic prefix (CP) length of a symbol in the resource unit.

10. The device according to claim 9, wherein the processor is configured to: if the subcarrier spacing of the serving cell is $\Delta f_1$, determine that the length of the resource unit is $15/\Delta f_1 \cdot T_s$, wherein $\Delta f_1 = N_1$ 19 15 kHz, $N_1$ is a positive integer greater than or equal to 2, and $T_s = 1$ ms.

11. The device according to claim 9, wherein the processor is configured to determine, based on the subcarrier spacing of the serving cell, that the quantity of symbols in the resource unit of the serving cell is 14, wherein the subcarrier spacing of the serving cell is a multiple of 15 kHz.

12. The device according to claim 9, wherein the processor is configured to: determine, based on the subcarrier spacing of the serving cell, that the quantity of subcarriers comprised in the resource unit of the serving cell is 12, wherein the subcarrier spacing of the serving cell is a multiple of 15 kHz; or
determine, based on the subcarrier spacing of the serving cell, that the quantity of subcarriers comprised in the resource unit of the serving cell is a multiple of 12.

13. The device according to claim 9, wherein the processor is configured to: when the subcarrier spacing of the serving cell is $\Delta f_1$ determine that the effective symbol length of the symbol comprised in the resource unit is $15/\Delta f_1 \cdot 2048 \cdot T_s$,
wherein $\Delta f_1 = N_1 \cdot 15$ kHz, $N_1$ is a positive integer greater than or equal to 2, and $T_s = 1/(15000 \times 2048)$.

14. The device according to claim 9, wherein the resource unit comprises a first normal CP symbol and a second normal CP symbol, and the processor is specifically configured to:
when the subcarrier spacing of the serving cell is $\Delta f_1 \cdot$, determine that a length of the first
normal CP symbol is $15/\Delta f_1 \cdot 160 \cdot T_s$, and a length of the second normal CP symbol is
$15/\Delta f_1 \cdot 144 \cdot T_s$, wherein $\Delta f_1 = N_1 \cdot 15$ kHz, $N_1$ is a positive integer greater than or equal to 2, and
$T_s = 1/(15000 \times 2048)$.

15. The device according to claim 14, wherein the resource unit comprises M1 first normal CP symbols and M2 second normal CP symbols, both M1 and M2 are positive integers, and when the subcarrier spacing of the serving cell has different values, values of M1 and M2 remain unchanged.

16. The device according to claim 15, wherein M1 is equal to 2, and M2 is equal to 12.

17. The device according to claim 15, wherein a symbol 0 to a symbol (M1−1) in the resource unit are the first normal CP symbols, and a symbol M1 to a symbol (M1+M2−1) in the resource unit are the second normal CP symbols; or
a symbol 0 and a symbol ((M1+M2)/2) in the resource unit are the first normal CP symbols, and symbols in the resource unit other than the symbol 0 and the symbol ((M1+M2)/2) are the second normal CP symbols.

18. A non-transitory computer-readable storage medium comprising instructions which, when executed by a processor in a first device, cause the processor to:
determining, by a first device, a subcarrier spacing of a serving cell based on a correspondence between a carrier frequency and a subcarrier spacing, or a correspondence
between a carrier frequency set and a subcarrier spacing set:
determining, by the first device, a resource unit of the serving cell based on the subcarrier spacing of the serving cell; and
sending, by the first device, information to a second device in the serving cell based on the resource unit of the serving cell, or receiving, In the serving cell based on the resource unit of the serving cell, information sent by the second device
wherein determining, by the first device, the resource unit of the serving cell based on the subcarrier spacing of the serving cell comprises:
determining, by the first device, a parameter of the resource unit of the serving cell based on the subcarrier spacing of the serving cell, wherein the parameter of the resource unit comprises at least one of a length of the resource unit, a quantity of symbols in the resource unit, a quantity of subcarriers in the resource unit, an effective symbol length of a symbol in the resource unit, or a cyclic prefix (CP) length of a symbol in the resource unit.

\* \* \* \* \*